US006449269B1

United States Patent
Edholm (10) Patent No.: US 6,449,269 B1
(45) Date of Patent: Sep. 10, 2002

(54) PACKET VOICE TELEPHONY SYSTEM AND METHOD

(75) Inventor: Phillip Karl Edholm, Fremont, CA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/224,548

(22) Filed: Dec. 31, 1998

(51) Int. Cl.$^7$ .............................................. H04L 12/66
(52) U.S. Cl. ...................................... 370/352; 370/392
(58) Field of Search ................................ 379/201, 207; 370/271, 351, 352, 353, 356, 392

(56) References Cited

U.S. PATENT DOCUMENTS

| | | | | |
|---|---|---|---|---|
| 5,502,727 A | * | 3/1996 | Catanzaro et al. .......... 370/271 |
| 5,815,503 A | * | 9/1998 | Li .............................. 370/471 |
| 5,838,718 A | * | 11/1998 | Ichihashi .................... 375/202 |
| 6,144,411 A | * | 11/2000 | Kobayashi et al. ......... 348/441 |
| 6,199,045 B1 | * | 3/2001 | Giniger et al. ................. 705/1 |
| 6,212,195 B1 | * | 4/2001 | McCormack et al. ....... 370/419 |
| 6,212,550 B1 | * | 4/2001 | Segur ......................... 709/206 |

* cited by examiner

Primary Examiner—Wellington Chin
Assistant Examiner—Brenda Pham (57) ABSTRACT

According to the present disclosure, connectionless base IP protocol is leveraged to transfer streaming voice to a destination telephony device. As such, the disclosed IP telephone includes a controller and memory specifying the destination IP address, a packetizer coupled the controller and memory for packetizing outbound digitized voice into at least one outbound IP packet, and a network interface for transmitting the outbound IP network onto a network which may involve a LAN, WAN or the Internet. The disclosed IP phone also includes an extractor coupled to the memory and controller for extracting inbound digitized voice within an incoming IP packet whose source address correlates to the destination IP address or addresses stored in the memory.

13 Claims, 6 Drawing Sheets

PACKET VOICE TELEPHONY SYSTEM AND METHOD

FIELD OF INVENTION

This invention is generally concerned with packet network telephony, and is particularly concerned with a packet voice telephone architecture.

DESCRIPTION OF THE RELATED ART

Within the past few years, a lot of interest, hype, and money has been spent on making practical use of the Internet. One of the most promising new technologies, and the one which may offer consumers the first real alternative to conventional switched telephone service, is Internet telephony. Simply put, Internet telephony is directed to using the Internet as the transport for telephone calls. Unlike the traditional telephone call, in Internet telephony, the use of the public switched telephone network is minimized, and instead the Internet backbone is used as the primary long-haul communications carrier. By leveraging fixed cost Internet access and global points of presence (the parties to the call could be as close as next door or as far away as the next hemisphere), Internet telephony can significantly reduce or even eliminate the time and distance costs heretofore expected in a long distance call utilizing the public switched telephone network ("PSTN").

In a conventional Internet telephony session, an originating computer having a TCP/IP stack and a communications pathway to the Internet establishes a TCP virtual circuit or UDP connection with a destination computer also having its own TCP/IP stack and communications pathway to the Internet. Once the TCP virtual circuit or UDP connection is established, analog voice perceived at the source computer is converted into streaming data and sent over the Internet in a series of TCP/IP or UDP/IP packets. The destination computer receives the so-packetized streaming data and converts it back to analog form as it is received. The destination may likewise transfer locally perceived streaming voice back to the source to enable two-way voice communications between the source and destination users, much like the traditional telephone call.

Known Internet telephony implementations are software-based, and require sophisticated multimedia computing resources be utilized by both the originating and destination points in order to establish and maintain the call. This is because these computing resources are designed to utilize the Internet in its traditional role as an asynchronous data communications network, and as such, need a reliable way to transfer information. The TCP protocol promises such reliability, since a single data route is selected and all TCP transferred data is checked at the destination to ensure all data is received in good condition (otherwise, the destination requests the source to resend the missing or corrupted packets). This protocol is great for transferring a data file or an application that doesn't work if even a small piece of data is missing. However, TCP is not so great when real-time streaming data such as voice is being transmitted, since it requires that the destination confirm delivery of each packet and request the source to resend it if it doesn't show up.

As a result, some known software-based telephony applications can be configured to attempt Internet telephony communications using UPD, real time protocol ("RTP"), real time control protocol ("RTCP"), or the recently announced real time streaming protocol (RTSP), all of which sacrifice TCP's transmission reliability to some degree in exchange for enhanced throughput and/or adding special timing information relevant to streaming data transmission. While these protocols offer improved real-time streaming data transmission performance over TCP, they nevertheless saddle the Internet telephony application or an apparatus with complicated negotiation and delivery requirements, which still require advanced computing resources to handle.

Moreover, even though conventional Internet telephony software may be available at low-cost or even bundled with the implementing computer, the underlying multimedia computer hardware required to execute the software is quite expensive when compared to the cost of a conventional telephone. Also, the interfaces are quite dissimilar, even if the telephony application displays a "phone" paradigm on the screen. This makes current Internet telephony applications difficult for the casual user to understand, much less utilize.

Therefore, it would be desirable if a simple telephony device was developed which could simultaneously transmit and receive packetized streaming voice data without the encumbrances imposed by existing reliable data communication or real-time protocols. It would also be desirable to provide a telephony device that provides a interface familiar with telephone users.

SUMMARY OF THE INVENTION

In accordance with these and related desires, the present invention is directed to Applicant perceives as a useful, novel and nonobvious packet voice telephone and telephony system incorporating the same. Consistent with a first embodiment of the present invention, the purely connectionless Layer 3 IP protocol is used to transfer streaming voice. As such, the IP telephone of the first embodiment includes a controller and memory specifying the destination IP address or addresses, a packetizer coupled the controller and memory for packetizing outbound digitized voice into at least one outbound IP packet, and a network interface for transmitting the outbound IP network onto a network which may include the Internet. Preferably, this IP phone also includes an extractor coupled to the memory and controller for extracting inbound digitized voice within an incoming IP packet whose source address correlates to the destination IP address or addresses stored in the memory.

By using base IP transmission protocol without TCP, UDP, or real time extensions, in this embodiment call setup and voice transmission operations are greatly simplified. This feature enables the IP telephone controller to preferably comprise a finite state machine for directing bi-directional IP packet flow in a purely connectionless manner. This finite state machine may be implemented by a programmed microntroller, or a synchronous network of discrete logic.

The IP telephone according to the first embodiment present invention preferably communicates with a phone server having a predetermined IP address in order to resolve user input into a viable destination IP address for establishing a call, as well as implement advanced call features such as forwarding and conferencing. To establish the call, the IP telephone packetizer may transmit a predefined call request IP packet to this phone server using the predetermined IP address as the destination address. The phone server will utilize a call model for resolving or verifying requested destination information specified by the user and contained in the data portion of the call request IP packet, and either issues a connection reply containing the resolved or verified destination IP address, or a connection error if the phone server is unable to decipher or confirm the desired destination information. In turn, the IP telephone controller will identify the server feedback and, if a connection reply is perceived, the destination IP address specified in the reply is placed in IP telephone memory. Thereafter, the packetizer will route digitized voice packets to this stored address.

According to a second embodiment of the invention, OSI level 4 and higher layer protocols (such as TCP/IP and ITU H.323) can be preserved through encapsulation, redirection, and resolution of such layer control. To this end, the IP telephone of the second embodiment will include a controller capable of directly or indirectly determining whether an incoming packet includes control information germane to the layer 4+ protocol being supported. If this controller determines that the received packet includes such control information which it cannot process internally, it encapsulates the received control information into an outbound layer 3 packet and directs that it be sent to the phone server using base IP protocols.

The phone server receives inbound layer 4+ control information, and, using appropriate higher layer service routines, extracts the control information and formulates a response. Then, the phone server encapsulates and broadcasts the response to the IP telephone using Layer 3 IP protocols and the controller of the IP telephone routes it to the destination in native higher layer format. In such way, the phone server of the second embodiment acts as a control, receipt and response intermediary that is transparent to the destination telephony device. Moreover, layer 4+ protocols can be supported while adding minimal processing functionality to the IP telephone controller, thereby keeping IP telephone costs low.

Preferably, the IP telephone of the first and second embodiments will include a dedicated handset much like a conventional telephone, and appropriate analog/digital converter circuitry coupled to the aforementioned extractor and packetizer for converting voice acquired by the handset microphone into outbound digitized voice as well as for converting inbound digitized voice into analog for playback in the handset speaker.

In addition, preferably, the IP telephone according to the first and second embodiments of the invention includes a phone-like keypad for eliciting desired destination identification information from the user. The destination information may consist of the destination's IP address or addresses, or other information from which the destination IP address can be locally or remotely resolved. In addition, a display may be provided so that the user can e.g. self-verify her keypad entry or identify the calling party.

Other aspects and features of the present invention will become apparent to those ordinarily skilled in the art upon review of the following description of the specific preferred embodiments of the invention in conjunction with the accompanying figures.

BRIEF DESCRIPTION OF THE DRAWINGS

The features of the invention, as well as the invention itself may be best understood with reference to the following drawings, in which like numbers indicate like parts, to which.

DETAILED DESCRIPTION OF THE PREFERRED EMBODIMENTS

In the following detailed description, references are made to the accompanying drawings which form a part hereof and in which is shown by way of illustration specific embodiments in which the invention may be practiced. These embodiments are described in sufficient detail to enable those ordinarily skilled in the art to practice the invention, and it is to be understood that other embodiments may be utilized in that structural, logical, and electrical changes may be made without departing from the spirit and scope of the invention. The following detailed description is, therefore, not to be taken in the limiting since, and the scope of the present invention is to be defined solely by the appended claims.

Figure 1:
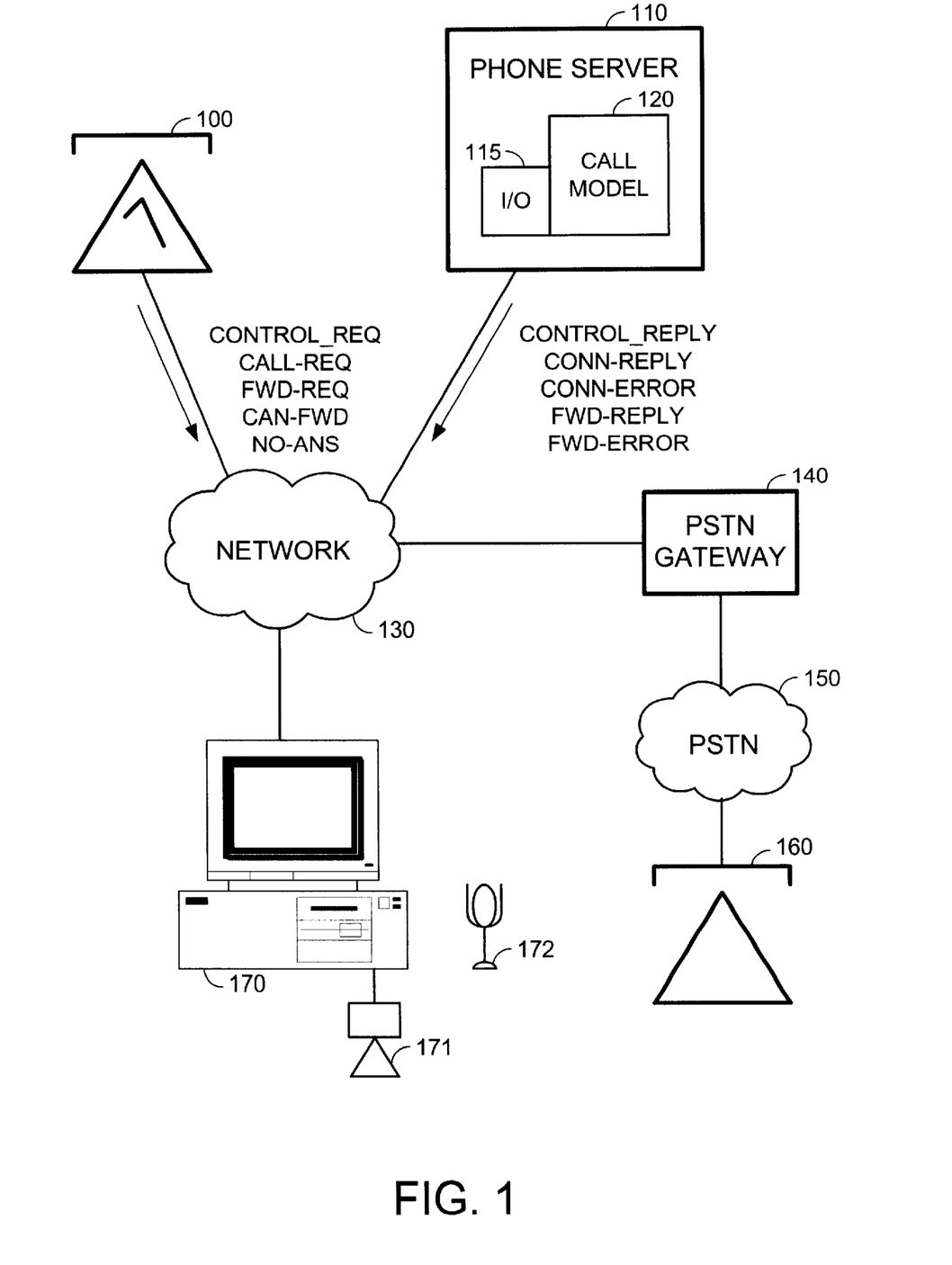
FIG. 1 is a system diagram implementing an IP telephone according to a first embodiment of the invention.

A network diagram including the IP telephone of the first embodiment of the invention is shown with reference to FIG. 1. As shown in the figure, Internet telephone 100 is coupled to network 130 which can comprise a LAN/WAN or the Internet. As will be discussed in greater detail hereinbelow, the IP telephone 100 will include sufficient network resources to enable the broadcast receipt of Internet protocol ("IP") packets of digitized voice to and from other telephony devices in communication with the network 130.

Also coupled to the network 130 is a phone server 110. This phone server is used to resolve call requests emanating from the Internet telephone 100 as well as issued connection replies or connection errors in response thereto. Such call requests will be received by, and resulting connection replies or errors transmitted by the network 130 aware I/O module 115 of the phone server 110. A call model 120 within the phone server 110 will be used to resolve destination information contained in the call request and indicate whether the connection reply or connection errors should be transmitted by the aforementioned I/O module 115 to the requesting IP telephone 100. The call model 120 is also assigned to handle forward requests and forward cancellation requests issued by the IP telephone 100, and so will direct the I/O module 115 to issue the appropriate forward reply or forward error to the requesting IP telephone 100. A more detailed description of the requests (e.g. CONTROL_REQ, CALL_REQ, FWD_REQ, CAN_FWD) replies (CONTROL_REPLY, CONN_REPLY, FWD_REPLY) and errors (CONN_ERROR, FWD_ERROR, NO_ANS) issued by the IP telephone 100 or phone server 110 shown in FIG. 1, as well as their interpretation and handling, will be discussed in more detail below with reference to the block diagram of FIG. 3 and the alternative state transition diagrams of FIGS. 4 and/or 6.

Still referring to FIG. 1, also coupled to network 130 is PSTN gateway 140 to allow communications between IP telephone 100 and/or other devices connected to the network such as computer 170 to communicate to a remote telephone 160 via the public switched telephone network ("PSTN") 150. PSTN gateway 140 and computer 170 are conventional telephony devices well known in the art and accordingly detailed description thereof is omitted herein other than to amplify the principles of the present invention.

It should be noted here that through the call establishment and IP packet transmission procedures discussed below, Internet telephone 100 may be able to invoke and maintain an Internet telephony session with multimedia computer 170 including microphone 172 and speaker 171 connected to network 130 or even conventional telephone 160 connected to network 130 via the aforementioned PSTN gateway 140. Also, although not shown in figure, the IP telephone 100 also place a voice over IP telephone call and maintain a call with a like IP telephone, as will readily be understood by those ordinarily skilled in the art upon review of this disclosure.

Figure 2:
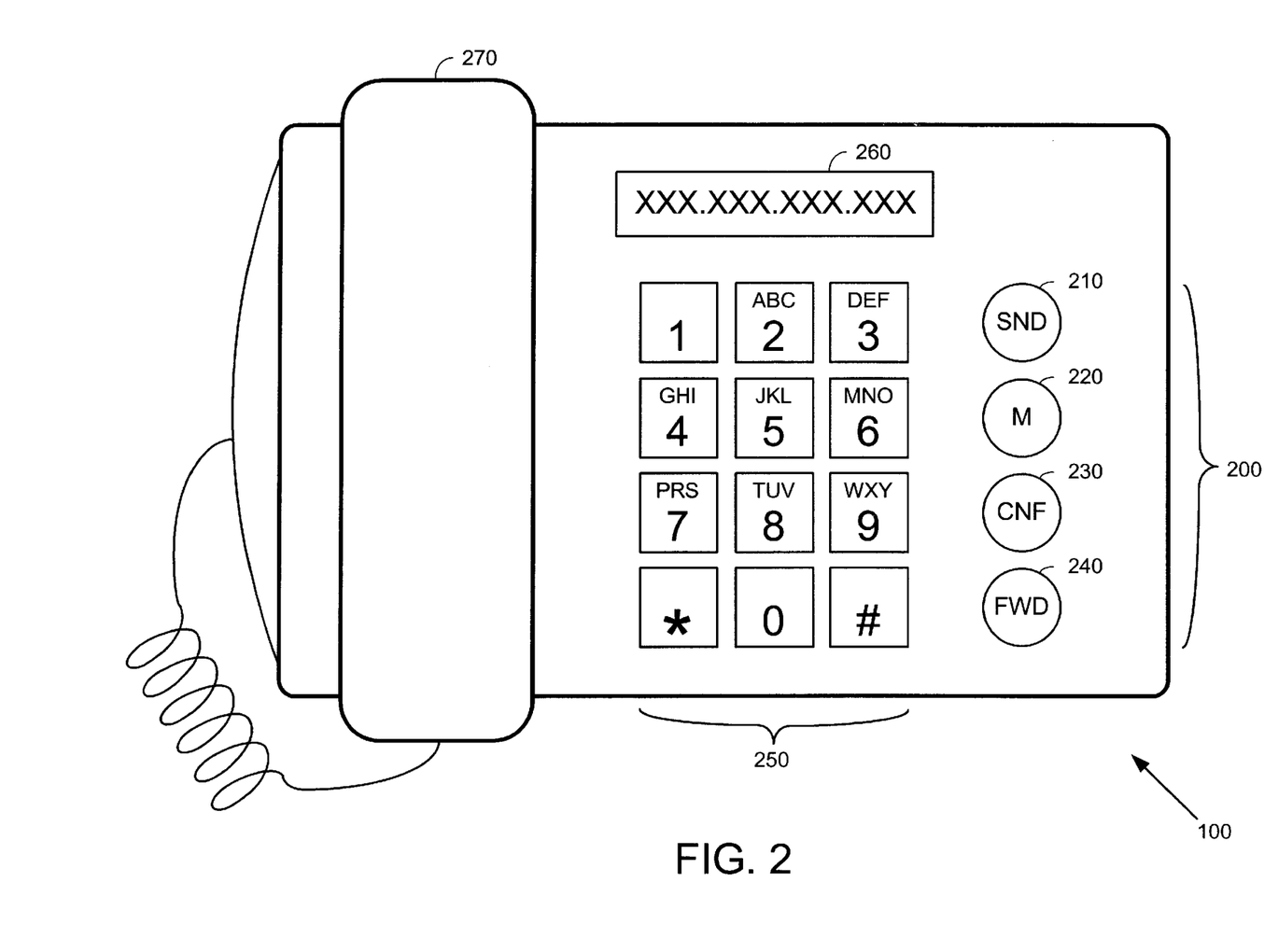
FIG. 2 is a plan view of the IP telephone of FIG. 1.

Turning now to FIG. 2 the simplified plan view of the IP telephone 100 of FIG. 1 indicating the major external functional components of the Internet telephone according to the first and second embodiments of the invention. As shown therein, IP telephone 100 takes on the general appearance and form factor of a conventional PSTN telephone, and as such includes a handset 270 including a speaker 300 (FIG. 3) for relaying incoming voice to the user thereof as well as microphone 302 for acquiring voice spoken by the user. Keypad 200 including phone keys 250 are disposed on the base 280 of the IP telephone 100 arranged as in the case of a conventional telephone. The keypad is used by the Internet telephone 100 to capture user input conveying destination information as well as selectively activate or deactivate advanced calling features such as conference (CNF) and forward (FWD). As will be discussed hereinbelow with reference to FIG. 4, according to the present embodiment, the user will specify destination information by entering a sequence of digits using phone keys 250 accompanied by depression of the send button (SND) 210 or the memory key (M) 220 followed by one or more of the digit phone keys 0–9. It should be realized here that requiring the user to terminate entry with a predetermined keystroke (the send key) or sequence of stokes (the memory key followed by one of the digit phone keys 0–9) greatly simplifies acquisition of the user entry as well as the error-checking and interpretation thereof, at least with respect to the IP telephone 100.

A display 260 is also provided on base 280 for providing user feedback regarding the digits keyed in via keypad 200 of the IP telephone 100 and/or the status of the phone itself as well as that of the remote phone server 110. Also, in the case of an incoming call, information involving the calling or called party may be obtained and displayed as is with the case of conventional calling line identification technology, since the originating VOIP device(s) IP address is contained in each packet received by the IP telephone. In addition, the display 260 may be used to provide visual cues to the user regarding the request and reply transactions used in establishing a call according to the present embodiment.

Preferably, although not required, this display will be a single line alpha-numeric display is an LCD display to reduce development and manufacturing costs of IP telephone 100.

A detailed discussion of the conference (CNF) 230 and the forward (FWD) 240 buttons will be discussed hereinbelow with reference to FIG. 4.

Figure 3:
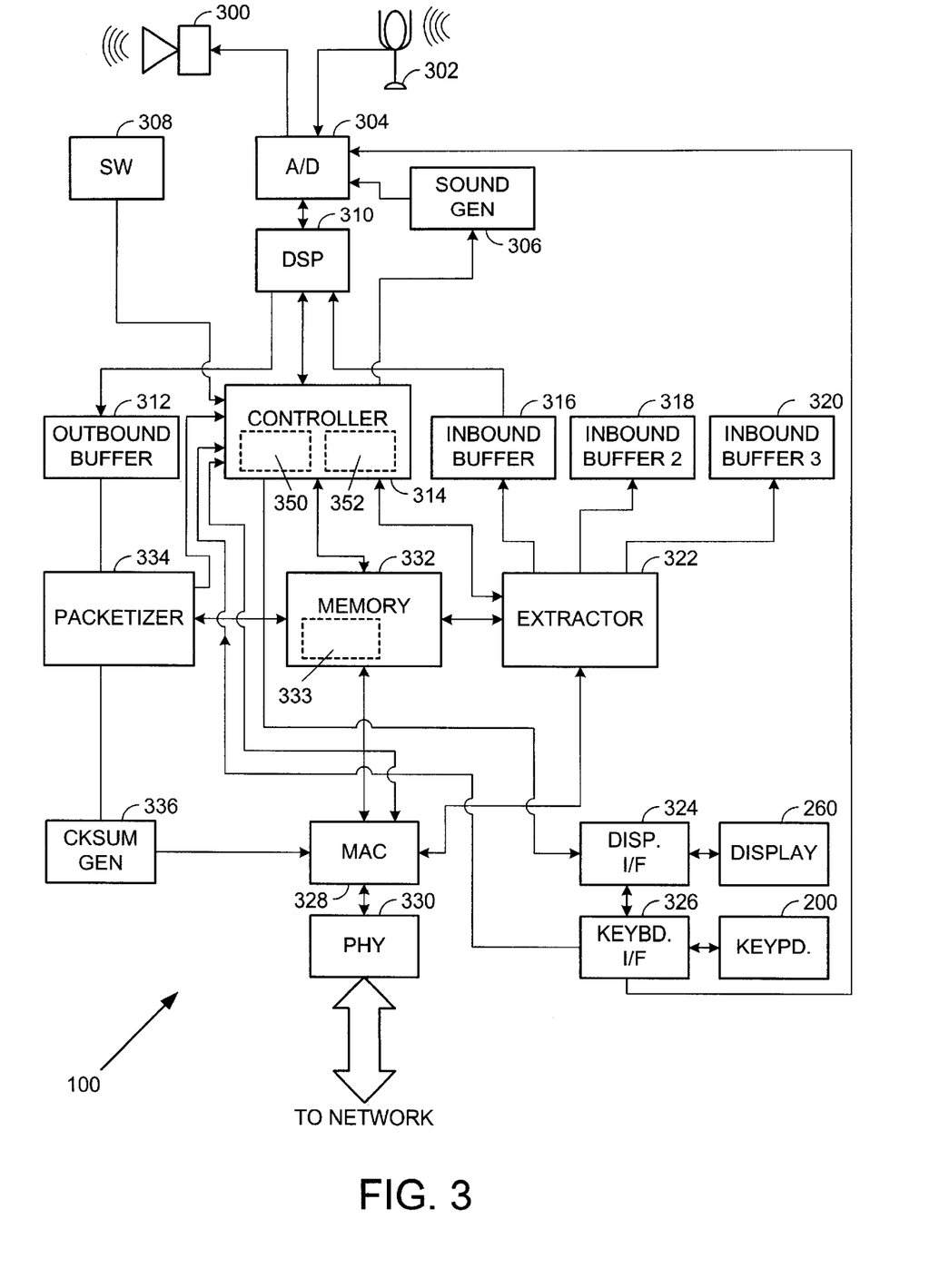
FIG. 3 is a schematic block diagram of the IP telephone of FIGS. 1 and 2.

FIG. 3 is a system block diagram of the IP telephone 100 according to the first and second embodiments of the invention. As shown therein, speaker 302 residing in handset 270 (FIG. 2) is coupled to analog/digital converter 304 for converting perceived speech into an appropriate digital form. In this embodiment, analog to digital converter 304 converts acquired speech into PCM coded data representing voice sampled at sufficient sampling rate to ensure that at least conventional PSTN voice quality can be assured. Also coupled to analog/digital converter 304 is a sound generator 306 for providing alert tones in digital form to analog/digital converter 304 which it then converts it into appropriate analog format for transmission to the user via speaker 300 located in the handset or another audio output device (not shown herein). Also coupled to analog/digital converter 304 is digital signal processor ("DSP"). DSP 310 is used for selectively encoding or decoding inbound and outbound digitized voice respectively using industry standard H.323 compression techniques. Also, DSP 310 is used to selectively encode or decode inbound or outbound digitized voice respectively using echo cancellation procedures well known in the art. Coupled to the output of DSP 310 is an outbound FIFO buffer 312 used for temporarily storing process digitized voice captured by the microphone 302 for subsequent delivery to the packetizer 334 described hereinbelow.

Packetizer 334 is coupled to the output of outbound buffer 312 to packetize the buffered and processed digitized voice into the payload of connectionless layer 3 Internet protocol (IP) upon authorization from controller 314. In the present embodiment, the packetizer latches in a number of octets defining digitized voice from the outbound buffer 312 for each layer 3 IP packet to be created. The packetizer then queries memory 332 for the desired destination IP address (or IP addresses in the case of a conference call), and builds an IP packet header information using at least one of the returned destination IP addresses, a predetermined source IP address specified for the IP telephone 100, and the number of octets latched in from buffer 312 (preferably a predetermined number to reduce circuit complexity and increase processing speed). The Vers, Hlen, Service Type (high priority streaming data), Total Length, Identification, Flags, Fragment Offset, Time to Live, Protocol (base IP), Header, Options, and any padding fields of the IP packet header can be obtained using the above-identified size and addressing information or through predefined or hard-coded values retained by the packetizer 334 or memory 332, as is well known in the art. Once each IP header is built (but for error correction checksum fields), the latched in digitized voice octets are placed into the data portion of the IP packet, and result is sent to the checksum generator 336.

Also, the packetizer 334 of the present embodiment is capable of generating predefined requests (i.e. the call request CALL_REQ or the forward request FWD_REQ or CAN_FWD) directed to the phone server 110 or a predefined NO_ANS error message to be relayed to the source IP address of an incoming call indicating that no answer has occurred. Each are generated in this embodiment by the packetizer 334 upon direction of the controller 314.

With respect to each of the aforementioned requests, the packetizer 334 will build the IP packet header of the IP packet embodying the request using the pre-established address of the IP telephone 100 as the source address and the pre-established IP address of the phone server 110 assigned to service the IP telephone 100. In the case of the call request (CALL_REQ) and forward request (FWD_REQ) requests, the data portion of the packet will include appropriate request identification information understood by both the telephone 100 and the phone server 110 as well as any user information captured from keypad 200 and relayed to the packetizer 334 by controller 314 for resolution by the aforementioned call model component 120 of the phone server 110. However, in the case of the cancel forward request, the data portion of the packet will only include request identification information used by the call model 120 of the phone server 110 to classify the request and cancel any existing forwarding state for the IP telephone 100 established via a prior forward request.

In the case of the NO_ANS request, the packetizer 334 of this embodiment builds an appropriate IP packet specifying the source IP address of a perceived and correctly routed incoming IP packet determined as being an incoming caller to notify this caller that VOIP communications cannot proceed at the present time. The data portion and format is not of true significance, and in fact any data can be placed in the data portion of the IP packet defining the IP request as long as the so-mentioned no answer notification can be ascertained by the calling device or terminal.

As mentioned previously, coupled to the output of packetizer 334 is check sum generator 336 for filling out error correction information (specifically, the Checksum field disposed within each IP packet header) for each of the request, error and streaming preferably PCM-digitized voice IP packets generated by packetizer 334. In turn, the output of checksum generator 336 is connected to the network interface 340 herein comprising media access controller ("MAC") 328 coupled to a physical transport 330. In this embodiment, the network interface 340 is an IEEE 802.3 compliant Ethernet interface connecting to Ethernet network 130 using known Ethernet protocols and transport mechanisms. It should be realized here, however, that the teaching present invention are limited to any particular type of physical layer network interfacing or network transport as long as bi-directional transmission of layer 3 IP packets can be accomplished, as is well understood in the art. As such, other types of networks and accompanying interfaces such as token ring, ATM, SONET, modem PPP or SLIP server are contemplated here without detracting from the teachings of the invention.

The physical transport 330 may contain a dedicated port or termination node to the network 130 or it may involve a pass-through connection serving as an intermediary between another network device such as a computer and the network 130. If so, the media access controller will employ collision avoidance mechanisms well known in the networking arts to avoid packet collisions with any other downstream attached device(s) to the physical layer 330.

Also, the media access controller 328 preferably intercepts and extracts at least the source and destination IP address information for inbound packets received from network 130 via the physical transport 330. The MAC 328 will retain IP packets having the same destination address as the IP telephone's predetermined IP address stored in memory 332, and will route onto the extractor 322 at least those retained packets indicating as a source address at least one of the destination IP addresses or indicating the predetermined destination address for the phone server 110. As be discussed hereinbelow in greater detail with respect to incoming call processing shown in FIG. 4, retained IP packets specifying source address which does not match any of the established destination IP addresses or the phone server 110's pre-established address will be assumed in this embodiment to be an incoming call.

Still referring to FIG. 3, the extractor 322 is coupled to an output of the MAC 128 for receiving inbound packets matching the predetermined phone server 110 or established destination IP addresses stored in memory 332. The extractor will extract the digitized voice contained in these packets and pass it along to the inbound FIFO buffer 316. If conference features according to the present embodiment are supported, in addition, the extractor will be able to match the IP source address of the inbound packets to each of the established IP destination addresses stored in memory 332 and route the digitized voice samples therein to one of up to three different buffers 316, 318, and 320 corresponding to the established IP addresses. Although additional buffers above three can be supported (and so additional conferees can be supported), in this embodiment only up to three conferees are supported in view of practical needs for such conferencing as well as resulting additional circuitry complexity and components costs additional buffers would impart.

In addition, the extractor 322 of this embodiment will perceive one of the aforementioned replies (i.e. the connection reply CONN_REPLY or forward reply FWD_REPLY) or error messages (i.e. connection error CONN_ERROR or forward error FWD_ERROR) issued by the phone server 110 in response to requests issued by the IP telephone 100 by sequentially evaluating the source IP address and the data portion of the incoming IP packet if the source IP address matches the preestablished phone server IP address. If such replies or error messages are received, the data portions of each are submitted to the controller 314 of the present embodiment for processing in accordance with the state transition diagram shown in FIG. 4 and discussed in detail hereinbelow.

Still referring to FIG. 3, the output of each inbound FIFO buffer 316, 318, and 320 is coupled to DSP 310. In turn, as stated above, DSP 310 will take received digitized audio streams placed in these buffers as they are received and will selectively decode them using known echo cancellation and h.323 compression techniques. The decoded streams are then relayed on to analog/digital converter 304 for subsequent transmission in analog form to the user using speaker 300 or similar output device (not shown).

The controller 314 is coupled to the aforementioned packetizer 334, memory 332, the extractor 322, the media access controller 328 and the DSP 310 for sequencing call setup and packet transmission reception procedures according to the present embodiment. The controller herein will include phone server 350 and answer 352 timing resources for controlling internal timing for said processing as will be described hereinbelow with reference to the state transition diagram of FIG. 4.

The controller 314 is also coupled to display 260 to display interface 324 as well as keypad 200 through keypad interface 326. Display interface 324 will perform routine display operations of information provided by controller 314 as well as track keypad entry from keypad 200 responsive to the de-bounced keystrokes detected by keyboard interface 326. Likewise keypad interface 326 notifies controller 314 and display interface 324 what keys have been depressed by the user. In addition, keypad interface 326 includes a conventional DTMF sound generator (not shown) for placing DTMF sounds into the inbound and outbound voice streams.

Also coupled to controller 314 is off-hook switch 308 used for indicating the current hook state of the handset 270 of the IP telephone 100.

Figure 4:
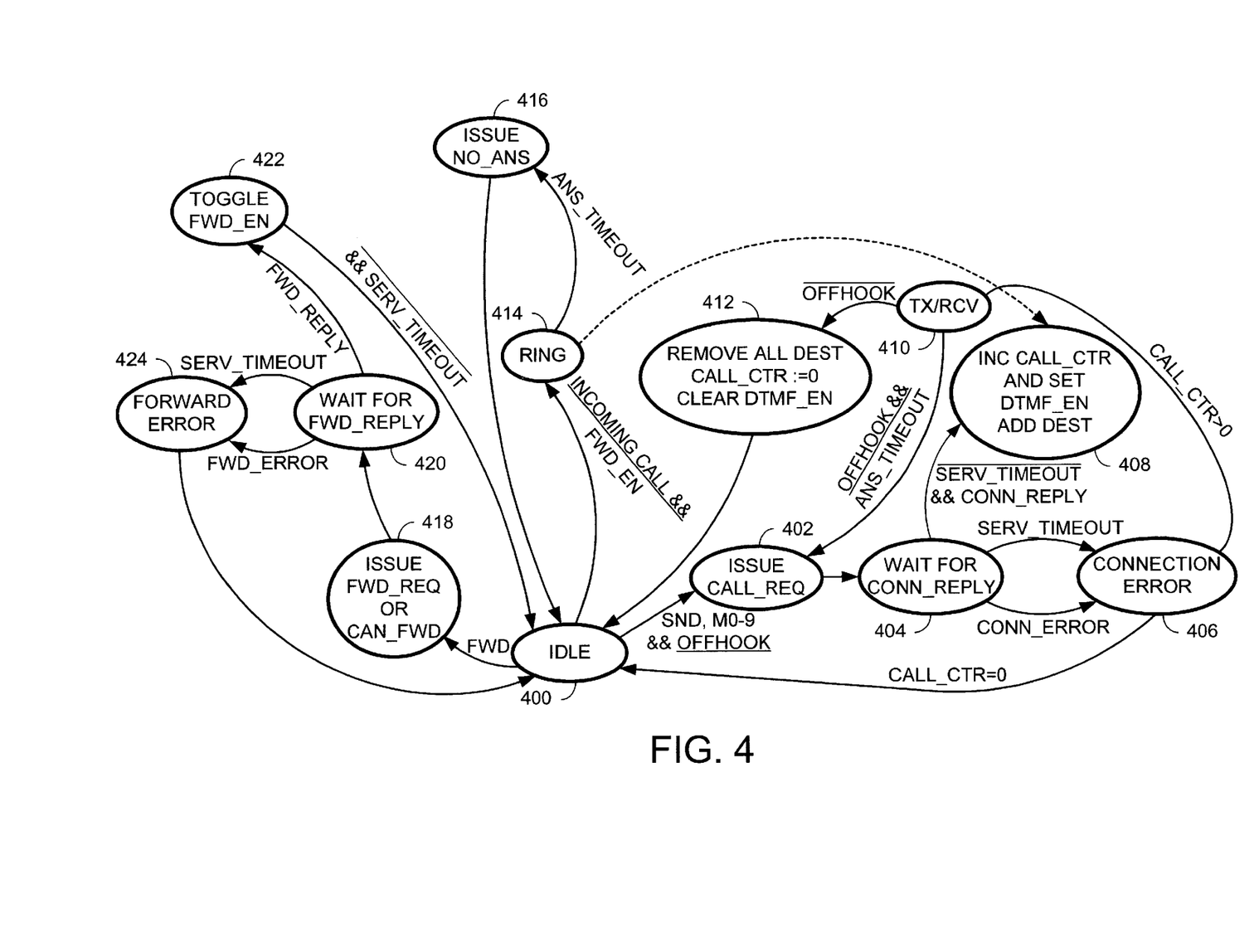
FIG. 4 is a state transition diagram for the controller of FIG. 3 according to the first embodiment of the invention.
Figure 5:
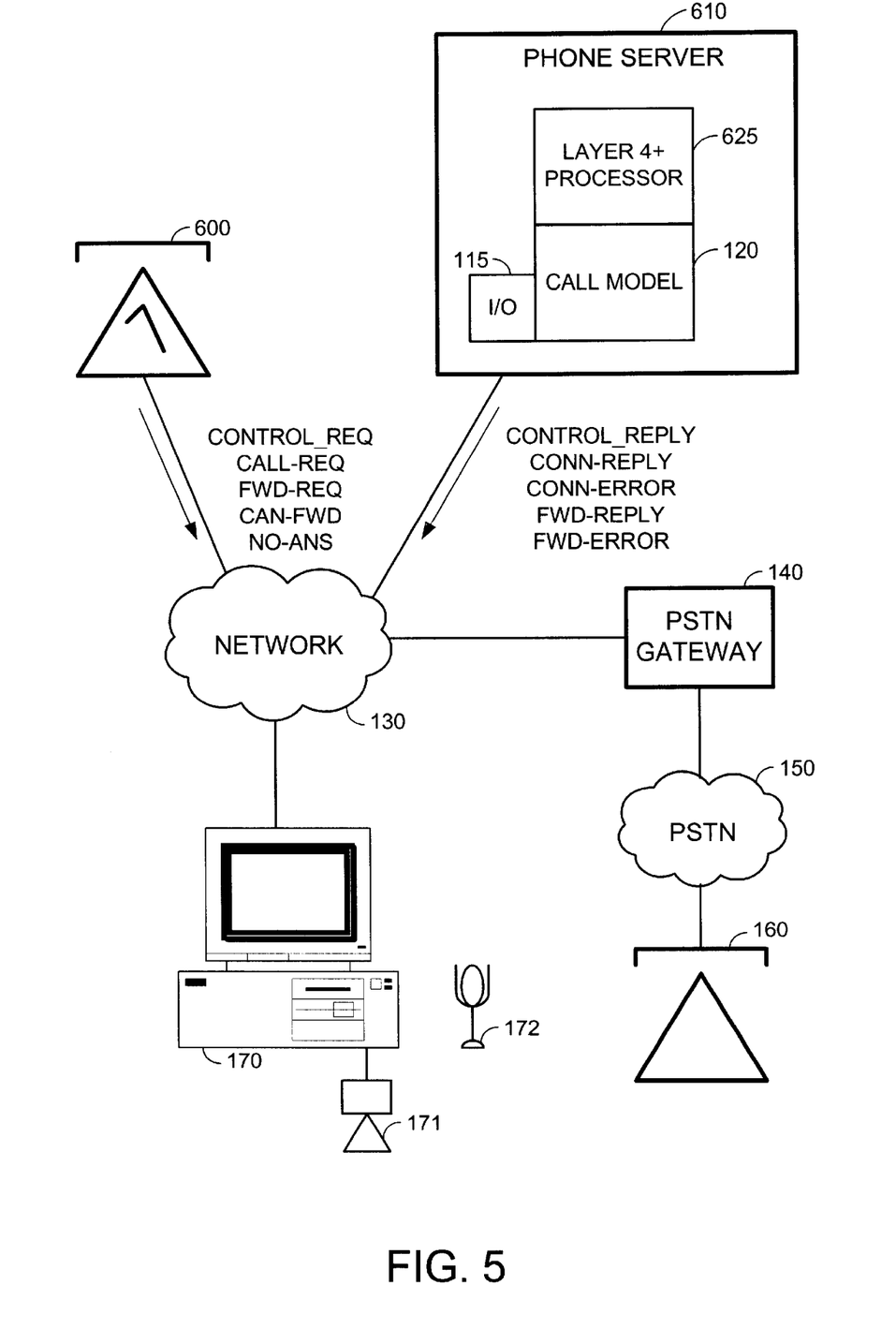
FIG. 5 is a system diagram implementing an IP telephone according to a second embodiment of the invention.

FIG. 4 is a state transition diagram executed by the controller 314 shown in FIG. 3 in isolation, or in conjunction with the other highlighted components of the IP telephone 100 according to the first embodiment of the present invention. The idle state is represented at 400. When a digit sequence terminating in a send (SND) key, or a sequence comprising a memory key plus one of digits 0-9 is detected by the controller 314, AND the handset is in an off-hook state the controller transitions to state 402. At state 402, the controller 314 instructs the packetizer 334 to issue a call request to the phone server 110 (FIG. 1). In turn, the packetizer will query memory 332 for the phone server 110's IP address and then place a CALL_REQ IP packet to the phone server, as discussed above. The packetizer 334 will include information captured from the user using keypad 200 indicated before depression of the send (SND) button. Alternatively, the packetizer can consult a predefined memory table containing IP address entries corresponding to key sequence M0,M1, M2, . . . , N9 as is well known in the art. Also, in state 402, the controller resets a watchdog server time-out timer 350 used to indicate a period of time in which the IP telephone 100 is likely to receive a response from a connected phone server 110.

Thereafter control transitions to state 404 in which the controller 314 waits for a connection reply (CONN_REPLY) from the phone server 110 servicing the IP telephone 100. If the aforementioned server timer 350 expires before receipt of the CONN_REPLY from the phone server 110, a SERV_TIMEOUT signal is issued and control transitions to error state 406. At state 406, a connection error is perceived by the controller 314. Likewise, if during the duration of the server timer 350 initialized in state 402, a connection error CONN_ERROR has been perceived by the controller 314 based on communications with the extractor 322, control likewise transitions to state 406. In either case, at state 406 a connection error tone is transmitted to the user and the status of the call counter variable is interrogated. When no calls have previously been established, in this embodiment, the control will transition back to the idle state 400. However, where the call counter is greater than 0 indicating that a successful connection has already been established as will be discussed hereinbelow, control transitions to the IP voice packet transmit and receive state 410.

If, however, while in state 404 a connection reply (CONN_REPLY) has been received before the server timer 350 has timed out, control instead transitions to state 408 in which the call counter is incremented, indicating that a successful telephony connection has been established with the destination. In addition, at this state the controller will add the resolved destination IP address specified in the connection reply to the memory 332. Also in this embodiment, a DTMF_EN enable flag is set indicating that the keypad interface 326 will generate DTMF tones responsive to the phone keys 250 (FIG. 2) depressed by the user, as is well understood in the art. Thereafter, control transitions to state 410 where perceived voice is captured, digitized packetized, and transmitted by the IP telephone 100 and inbound IP packets are received and assembled into inbound voice streams for replay over speaker 300 or similar output device.

Call termination processing according to the first embodiment is now detailed. From the transmit/receive state 410, if the controller perceives that the user has placed the handset back in the cradle portion of base 280, and the off-hook switch has been toggled in the on-hook state, control transitions to state 412. At state 412, it is assumed that the user wants to hang-up, so all the destination IP addresses are flushed from memory 332, the call counter is initialized to 0 and the DTMF_EN flag is cleared. Control thereafter transitions back to the idle state 400.

Call conferencing according to the first embodiment is now detailed. From the transmit/receive state 410 in which a call has already been established, if a conference key 230 is depressed by the user, the controller transitions back to state 402 in which the controller 314 instructs the packetizer to issue an appropriate call request. Control then transitions to state 404, 408, or 406 as outlined hereinabove. It should be noted here that since connectionless data transfer is contemplated using IP packets, the extra connection only involves verification or resolution by the call model 120 of the phone server 110 and receipt of the CONN_REPLY including the resolved destination IP address before the server timer 350 expires. Also, as stated previously, assuming that a successful conference connection has been made, extractor 322 will route the conferee's received digitized voice to inbound buffer 318 instead of inbound buffer 316 so as not to garble the incoming streaming audio data of the two called parties whose destination IP addresses are contained in memory 332. Also, as stated before, up to three callers (one original caller and up to two conferees) may be supported simultaneously.

An incoming call is handled by the IP telephone 100 of the first embodiment is now described with reference to FIG. 4. From the idle state 400, if the media access controller 128 determines that a received inbound IP packet specifies a source address not in the destination IP address list within memory 332, control transitions from the idle state to state 414. At state 414, the controller 314 instructs the sound generator 306 to send an alert tone to a ringer (not shown) to audibly indicated that an incoming call has been perceived, as with the case in a conventional analog phone. At the same time, the controller will initialize a watchdog answer timer 352 to time the duration of the ring before the handset is picked up. If the answer timer 352 times out before an off-hook state has been detected, control transitions to state 416 in which the controller instructs the packetizer to issue a predetermined NO_ANS error message IP packet to the calling party. Control thereafter transitions back to the idle state 400.

If, however, in state 414 controller perceives the off-hook state before the expiration of the answer timer 352's preset or adjustable duration, control instead transitions to state 408 which, as indicated above, the call counter incremented, the DTMF enabled flag is enabled and the calling party's originating IP address is added to the destination IP address list contained in memory 332. Control thereafter transitions to step 410 in which IP packet transmission and reception operations ensue.

Call forwarding is handled by the IP telephone 100 according to the first embodiment is now described with reference to FIG. 4. From the idle state 400, if the controller perceives that the forward button 240 has been depressed by the user, control transitions to state 418. At state 418, the controller selectively issues a forward request (FWD_REQ) or a cancel forward request (CAN_FWD) to the phone server 110 utilizing the aforementioned packetizer 334, check sum generator 336, and network interface 340 based on the status of h the forward enable FWD_EN flag contained in memory 332. It should b e noted here that if the forward request is deemed appropriate, destination information will be incorporated into the forward request FWD_REQ IP packet as specified by the appropriate user entry using keypad 200 as discussed hereinabove with respect to initiating a call. Also, at state 418, the controller restarts the server timer 352.

Control thereafter transitions to state 420, in which the control awaits for a forward reply FWD_REPLY issued by the phone server 110. If the aforementioned server time-out timer 350 expires before receipt of the FWD_REPLY from the phone server 110, a SERV_TIMEOUT signal is issued and control transitions to error state 424. At state 424, a forward error is perceived by the controller 314. Likewise, if during the duration of the server timer 350 initialized in state 418, a forward error FWD_ERROR has been perceived by the controller 314 based on communications with the extractor 322, control likewise transitions to state 424.

At the error state 424, an alert tone is generated to the user in state 424 and control then transitions back to the idle state 400. However, if a forward reply FWD_REPLY is received from the phone server before the server timer times-out, control transitions to state 402 in which the forward enable flag is toggled enabled, meaning that the forward request has been perceived and stored by the phone server 110, or disabled, meaning that a previous filled request has been canceled by the forward by the phone server 110. Control thereafter transitions to the idle state 400.

It should be noted here that while the forward enable flag is set, controller will not initiate a call nor will it answer an incoming call.

According to a second embodiment of the invention, an IP telephone-phone server tandem operates to set up and maintain voice over IP sessions with other IP telephony devices while preserving higher OSI layer (layer 4+) signaling (e.g. TCP/IP and/or ITU H.323) communications with these other telephony devices. According to this embodiment with reference to FIG. 6, the IP telephone 600 and the phone 610 server communicate using base IP (layer 3) protocols as is the case with the IP telephone 100 and server 110 described above with respect to the first embodiment of the invention. However, the IP telephone 600 will encapsulate the higher layer (layer 4+) control and signalling packets received from other telephony devices it has established a call or session with into layer 3 IP packets for transmission to the phone server 610.

Figure 6:
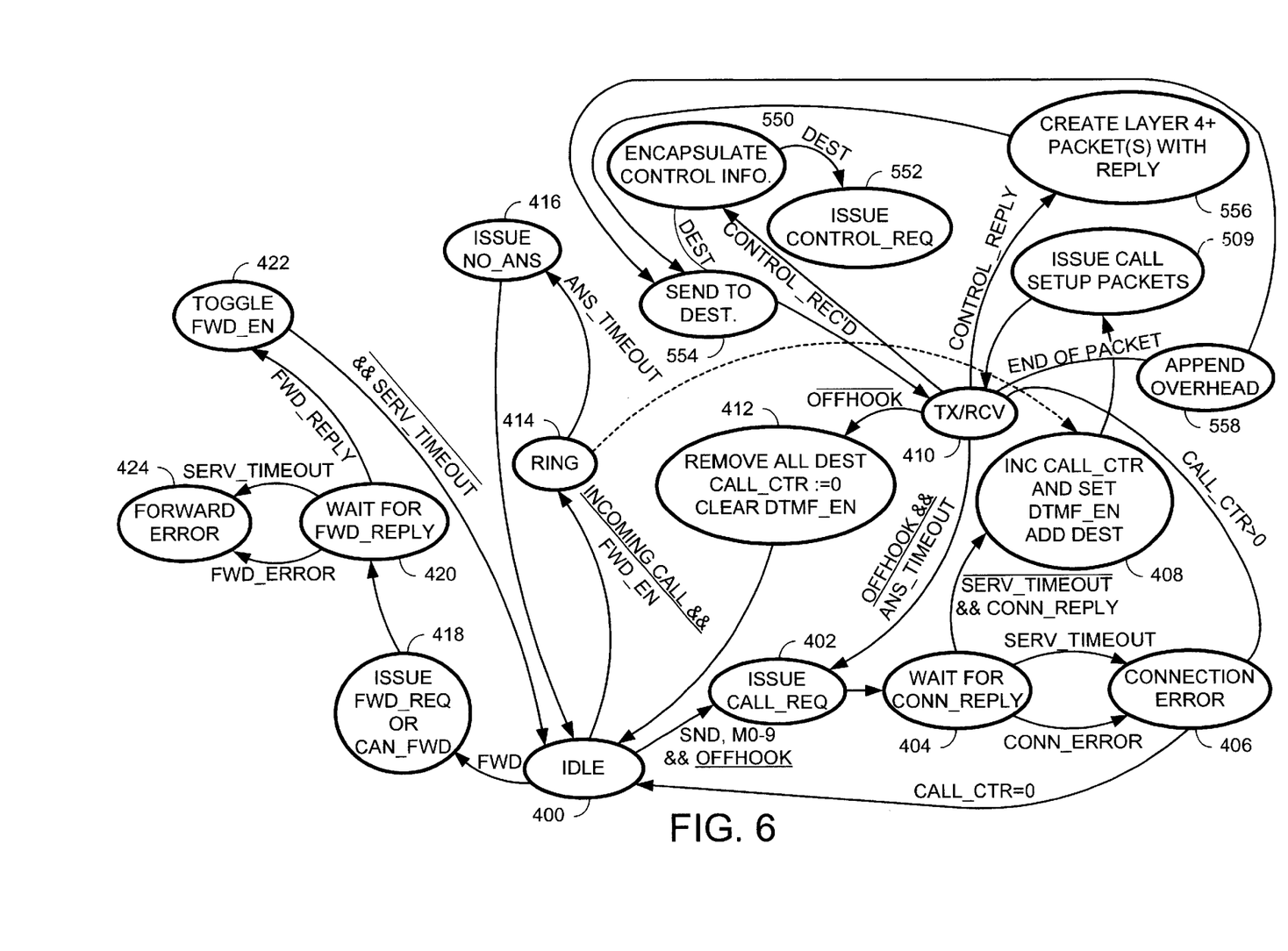
FIG. 6 is a state transition diagram for the controller of FIG. 3 according to the second embodiment of the invention.

According to the second embodiment, the phone server 610 includes a network aware I/O module 115 and call model 120 discussed previously, along with a layer 4+ processor 625 responsible for parsing the higher layer control and signaling packets forwarded by the IP telephone 600, and encapsulating the appropriate responses and control information in base layer 3 IP protocol for transmission back to the IP telephone 600. It should be noted that, except that the phone server knows to substitute origination information corresponding to the IP appropriate telephone 600 it is servicing rather than itself as the originator of these responses, conventional layer 4+ servicing routines may be conveniently utilized.

To make it appear to other telephony devices as though the IP telephone 600 that it is actually processing the layer 4+ control and signaling packets and thus appear as higher layer compliant, the IP telephone 600 (not the server 610) receives and transmits all higher layer packets to these telephony devices, including reissuing the higher layer control and signalling packets in native form sent to it by the server 610 encapsulated in base IP packets.

Thus, even though the server 610 according to this aspect of the present invention is given responsibility for actually acting on the layer 4+ commands, control and signalling packets used to e.g. set up an H.323 session, its operations and communications with the IP telephone 600 are transparent to the other telephony devices engaged in the communications session.

The functions of the telephone 600 as well as interactions with the phone server 610 may be best understood by referring to the telephone 600 controller state transition diagram of FIG. 6. As shown in FIG. 6, controller 314 processing is similar to that illustrated and described above with reference to FIG. 4, except as noted below. The primary difference is that, in this embodiment, once basic call setup is complete and call setup packets are broadcast from the IP telephone 600 (state 509), the controller 314 transitions to the TX/RCV state 510 to direct that layer 4+ voice and control packets (rather than layer 3) are created, issued, received, and voice information is extracted therefrom.

Thus, when the payload of packet to be sent to other telephony devices using layer 4+ protocols such as TCP/IP or H.323 is full, the controller 314 transitions to state 558, in which the controller 314 directs that the packetizer 334 develop appropriate layer 4 + overhead (such as the TCP/IP packet sequencing number) in a routine manner. Thereafter, the controller transitions to state 554 where it directs the packetizer 334 and checksum generator 336 to create and deliver a complete layer 4+ packet to the MAC 328 for transmission across the network 130 to the other telephony device(s) engaged in a layer 4+ call or session with the telephone 600.

Next, assume that the controller 314 according to the second embodiment detects an incoming packet received by the extractor 322 in fact contains control information germane to the layer 4+ protocol being utilized for communications (CONTROL_REC'D) while at state 510. If so, the controller transitions to state 550, where it directs the packetizer 334 to encapsulate the entire received control packet (or alternatively just the control portion) into a layer 3 packet for transmission to the phone server 610. It should be noted here that the controller 314 and/or extractor 322 will determine if the received packet constitutes or includes layer 4+ control information by e.g. comparing the received header/payload portions against a predefined protocol table (not shown) in memory 333.

From state 550, the controller 314 thereafter transitions to state 554, in which the controller directs the packetizer 334, checksum generator 336 and MAC 328 to transmit the layer 3 packet encapsulating the layer 4+ control packet to the phone server 610.

Next assume that the controller 314 according to the second embodiment detects that an incoming packet or packet stream received by the extractor 322 in fact contains encapsulated control response information generated by the phone server 610 (CONTROL_REPLY) while at state 510. In such case, the controller 314 transitions to state 556, in which the controller directs the packetizer to create a layer 4+ packet including the control response information presented in the payload of the incoming layer 3 packet. The controller thereafter transitions to state 554, in which the controller directs the packetizer 334, checksum generator 336 and MAC 328 to transmit the layer 4+ packet(s) including the control response information to the other telephony device(s) engaged in the call or session with the IP telephone 600.

It should be noted here that non-control layer 4+ components (such as TCP/IP sequencing placed in the header of each TCP/IP packet bearing a voice payload) are discarded without reply where possible to simplify construction of the telephone 600.

While the invention is described above in terms of specific preferred embodiments and associated drawings, those of ordinary skill in the art will recognize that the invention can be practiced in other embodiments as well. It is felt therefore that the invention should not be limited to the disclosed embodiments above, but rather should be limited only by the spirit and scope of the appended claims.

What is claimed is:

1. An IP telephone for use with a network, comprising
a controller comprising a finite state machine;
a memory coupled to said controller for selectively storing a destination IP address;
a packetizer coupled to said controller and said memory for packetizing outbound digitized voice into at least one outbound IP packet, the outbound IP packet including destination data based on the stored destination IP address;

a network interface in communication with said memory for broadcasting the outbound IP packet onto the network;

wherein said network interface captures an inbound IP packet, the inbound IP packet including source data correlating to the destination IP address; and an extractor coupled to said network interface and said controller for extracting inbound digitized voice from the inbound IP packet.

2. The telephone of claim 1, wherein said controller comprises a programmed microcontroller.

3. The telephone of claim 1, wherein said controller comprises a synchronous network of discrete logic components.

4. The telephone of claim 1, wherein said finite state machine, said memory, said packetizer, and said network interface are commonly housed in an ASIC.

5. The telephone of claim 1, wherein the destination IP address includes plural IP addresses.

6. The telephone of claim 1, further comprising:

a handset, said handset including a speaker and a microphone for acquiring and relaying voice respectively; and an analog/digital converter coupled to said handset for converting acquired voice into the outbound digitized voice and for converting inbound digitized voice into analog form.

7. The telephone of claim 6, further comprising a digital signal processor coupled to said analog/digital converter, said controller, said packetizer, and said extractor for selectively performing echo cancellation and compression operations on the inbound and outbound digitized voice.

8. The telephone of claim 6, further comprising:

a base;

a keypad disposed on said base;

a keypad interface coupled to said controller and said keypad for detecting at least one keypress and for selectively issuing a corresponding DTMF tone to said analog/digital converter.

9. The telephone of claim 1, wherein said network interface comprises:

a transparent transport coupled to the network, said transport including connection means for coupling a computer to said network and transporting computer data to and from the computer; and a media access controller coupled to said transport, said media access controller including collision enforcement means coupled to said transparent transport for broadcasting the outbound IP packet onto the network without influencing the computer data.

10. An IP telephony system, comprising:

an IP telephone, comprising:

a controller;

a memory coupled to said controller;

a packetizer coupled to said controller and said memory for packetizing a call request into an outbound IP packet; and an interface for transmitting the outbound IP packet; and a phone server in communication with said IP telephone, comprising:

an IP parser for parsing the call request from the transmitted outbound packet;

a call model for resolving a destination IP address from the extracted call request and transmitting the destination IP address to the IP telephone as an inbound IP packet;

wherein the IP telephone further comprises an extractor coupled to said controller, said memory, and said interface for extracting the destination IP address from the inbound IP packet and storing the destination IP address into said memory.

11. The IP telephony system of claim 10, wherein said packetizer packetizes outbound digitized voice into a stream of outbound IP packets, each outbound IP packet of the stream including destination data based on the stored destination IP address.

12. The telephony system of claim 10, wherein said telephone controller comprises a finite state machine.

13. An IP call establishment method, comprising the steps of:

packetizing a call request into an outbound IP packet;

transmitting the outbound IP packet;

remotely parsing the call request firm the transmitted outbound packet;

remotely resolving a destination IP address from the call request;

storing the IP address in a memory coupled to a controller;

transmitting the destination IP address as an inbound IP packet;

extracting the destination IP address from the inbound IP packet; and packetizing outbound digitized voice into a steam of outbound IP packets, each outbound IP packet of the stream including destination data based on the stored destination IP address.

* * * * *